US012742847B2

(12) United States Patent
Palakonda et al.

(10) Patent No.: US 12,742,847 B2
(45) Date of Patent: Sep. 22, 2026

(54) POWER EFFICIENT USER TRACKING

(71) Applicant: Ford Global Technologies, LLC, Dearborn, MI (US)

(72) Inventors: Sathyanarayana Chary Palakonda, Northville, MI (US); Jean De Dieu Mutangana, Detroit, MI (US); Ivan Vukovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 162 days.

(21) Appl. No.: 18/422,514

(22) Filed: Jan. 25, 2024

(65) Prior Publication Data

US 2025/0244437 A1 Jul. 31, 2025

(51) Int. Cl.
*G01S 5/00* (2006.01)
*G01S 5/02* (2010.01)
*G01S 5/14* (2006.01)

(52) U.S. Cl.
CPC ............ *G01S 5/019* (2020.05); *G01S 5/0268* (2013.01); *G01S 5/14* (2013.01)

(58) Field of Classification Search
CPC ........... G01S 5/019; G01S 5/0268; G01S 5/14
See application file for complete search history.

(56) References Cited

U.S. PATENT DOCUMENTS 10,055,917 B2 8/2018 Spahl et al.
10,285,013 B2 5/2019 Ledvina et al.
2016/0193729 A1* 7/2016 Williams ........... G01C 21/3856 901/1
2018/0143312 A1 5/2018 High et al.
2020/0137817 A1* 4/2020 Smith ................... H04W 84/18
2021/0170991 A1 6/2021 Parthasarathi et al.
2022/0258692 A1* 8/2022 Burke ................... B60R 25/245
2023/0013034 A1 1/2023 Tertinek
2023/0058744 A1* 2/2023 Lim ...................... H04W 4/023
2023/0090401 A1 3/2023 Ly-Gagnon et al.
(Continued)

FOREIGN PATENT DOCUMENTS

CN 114445938 A 5/2022
CN 115776723 A 3/2023
(Continued)

*Primary Examiner* — Kito R Robinson
*Assistant Examiner* — Erin Marie Hartmann
(74) *Attorney, Agent, or Firm* — Joseph Zane; Brooks Kushman P.C.

(57) ABSTRACT

A tracking approach for mobile devices is performed. Responsive to detecting, using a transceiver of the vehicle, a mobile device reaching a first distance from a vehicle, a designated UWB anchor of a plurality of UWB anchors of the vehicle is activated to perform time-of-flight (TOF) distance measurements between the vehicle and the mobile device. Responsive to the TOF distance measurements between the mobile device and the designated UWB anchor indicating the mobile device has reached a closer, second distance from the vehicle, the plurality of UWB anchors are activated to perform trilateration between the vehicle and the mobile device to identify a position of the mobile device. Based on the position, a subset of the UWB anchors of the vehicle are utilized to continue to perform the trilateration, and a remainder of the UWB anchors other than the subset of the UWB anchors are inhibited to save power.

20 Claims, 9 Drawing Sheets

700

(56) References Cited

U.S. PATENT DOCUMENTS

| | | | |
|---|---|---|---|
| 2023/0231591 | A1 | 7/2023 | Russell et al. |
| 2023/0251372 | A1 | 8/2023 | Van Wiemeersch et al. |

FOREIGN PATENT DOCUMENTS

| | | | | | |
|---|---|---|---|---|---|
| CN | 117360431 | A | * | 1/2024 | ............ B60R 25/24 |
| EP | 1915309 | A2 | | 4/2008 | |
| EP | 3981670 | A1 | | 4/2022 | |
| EP | 3982343 | A1 | | 4/2022 | |
| EP | 4226349 | A1 | | 8/2023 | |

* cited by examiner

Computing Device
902

POWER EFFICIENT USER TRACKING

TECHNICAL FIELD

Aspects of the disclosure relate to power saving techniques for detecting the proximity of a mobile device to a vehicle.

BACKGROUND

Some vehicles may be unlocked or started with a digital key. A digital key, sometimes implemented with a smartphone (e.g., phone-as-a-key), relies on communication between a mobile device such as a smartphone and the vehicle. When an application is activated on the mobile device and the mobile device is held at a particular location relative to the vehicle, such as next to the door handle, the vehicle unlocks the doors. A digital key may communicate with the vehicle using Bluetooth®, near field communication (NFC), and/or ultra-wideband (UWB).

SUMMARY

In one or more illustrative examples, a method for implementing an improved tracking approach for mobile devices is performed. Responsive to detecting, using a transceiver of the vehicle, a mobile device reaching a first distance from a vehicle, a designated UWB anchor of a plurality of UWB anchors of the vehicle is activated to perform time of flight (TOF) distance measurements between the vehicle and the mobile device. Responsive to the TOF distance measurements between the mobile device and the designated UWB anchor indicating the mobile device has reached a closer, second distance from the vehicle, the plurality of UWB anchors are activated to perform trilateration between the vehicle and the mobile device to identify a position of the mobile device. Based on the position, a subset of the UWB anchors of the vehicle are utilized to continue to perform the trilateration, and a remainder of the UWB anchors other than the subset of the UWB anchors are inhibited to save power. A component of the vehicle is actuated based on a result of the trilateration.

In one or more illustrative examples, a system for implementing an improved tracking approach for mobile devices includes a transceiver; a plurality of UWB anchors; and one or more computing devices. The one or more computing devices are configured to responsive to detecting, using the transceiver, a mobile device reaching a first distance from the vehicle, activate a designated ultra-wideband (UWB) anchor of the plurality of UWB anchors to perform time of flight (TOF) distance measurements between the vehicle and the mobile device; responsive to the TOF distance measurements between the mobile device and the designated UWB anchor indicating the mobile device has reached a closer, second distance from the vehicle, activate the plurality of UWB anchors to perform trilateration between the vehicle and the mobile device to identify a position of the mobile device; based on the position, utilize a subset of the UWB anchors of the vehicle to continue to perform the trilateration, and inhibit a remainder of the UWB anchors other than the subset of the UWB anchors to save power; and actuate a component of the vehicle based on a result of the trilateration.

In one or more illustrative examples, a non-transitory computer readable medium includes instructions for implementing an improved tracking approach for mobile devices that, when executed by one or more computing devices of a vehicle having a transceiver and a plurality of UWB anchors, cause the vehicle to perform operations including to: responsive to detecting, using the transceiver, a mobile device reaching a first distance from the vehicle, activate a designated ultra-wideband (UWB) anchor of the plurality of UWB anchors to perform time of flight (TOF) distance measurements between the vehicle and the mobile device; responsive to the TOF distance measurements between the mobile device and the designated UWB anchor indicating the mobile device has reached a closer, second distance from the vehicle, activate the plurality of UWB anchors to perform trilateration between the vehicle and the mobile device to identify a position of the mobile device; based on the position, utilize a subset of the UWB anchors of the vehicle to continue to perform the trilateration, and inhibit a remainder of the UWB anchors other than the subset of the UWB anchors to save power; and actuate a component of the vehicle based on a result of the trilateration.

DETAILED DESCRIPTION

Figure 1:
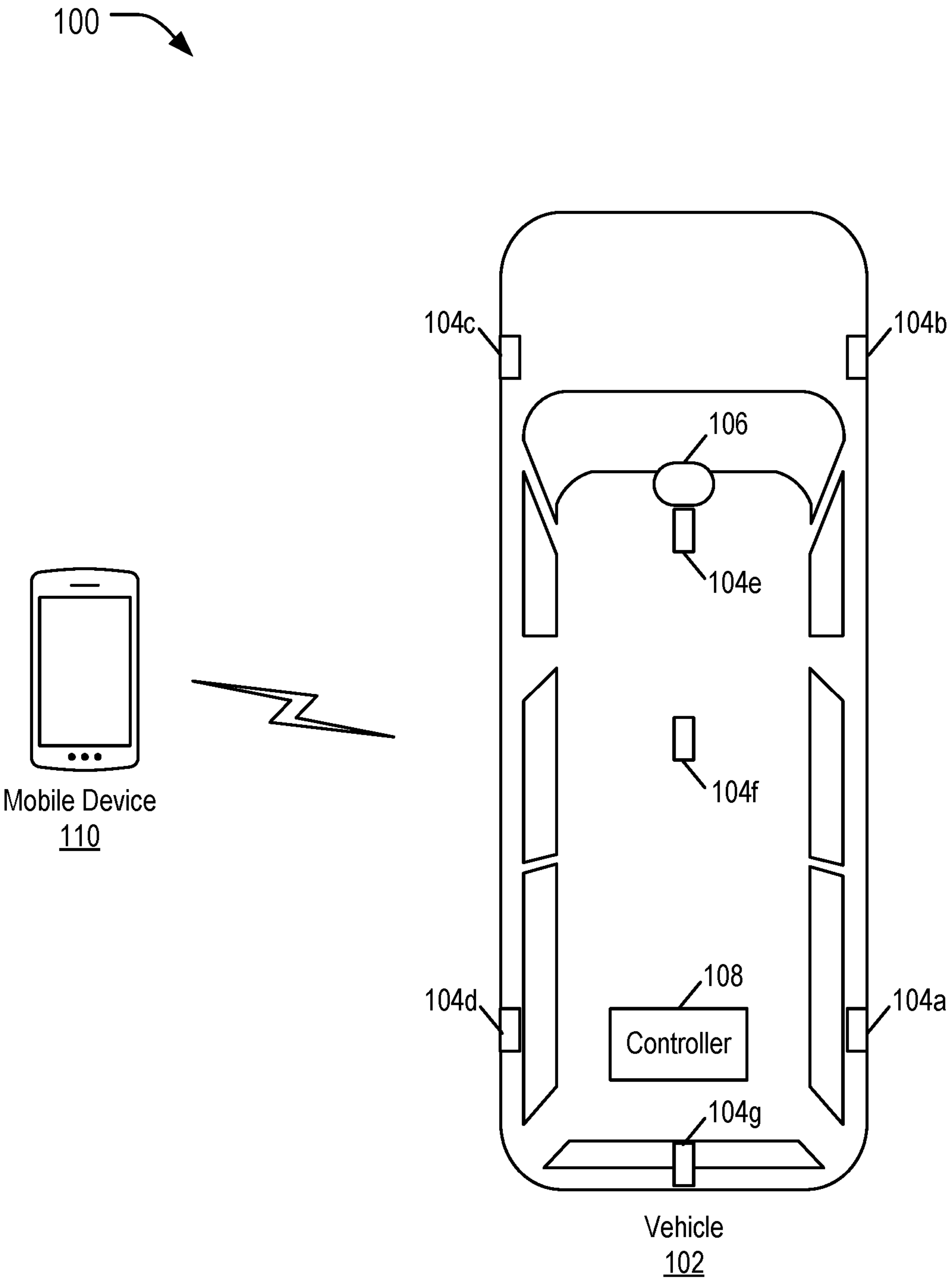
FIG. 1 illustrates an example system including a vehicle implementing an improved tracking approach to selectively power down various of the UWB anchors to preserve energy of the vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Features of the vehicle may rely on the relative location of a mobile device, e.g., digital key, remote park assist, smart tool, etc., in relation to the location of the vehicle. The controller of the vehicle may perform trilateration to determine the location of the mobile device. This may be performed using the UWB anchors in communication with the mobile device, which also may be equipped with an UWB transceiver. The controller uses the UWB anchors to determine distance data, which may include distances between the mobile device and the respective UWB anchors, e.g., based on TOF data between the mobile device and the UWB anchors. The trilateration can be performed using at least three TOF distances. Once the location of the mobile device is determined, the controller may actuate a vehicle component according to one of the features, e.g., unlocking the doors for the digital key or operating the vehicle for the remote park assist. Yet, such an approach may consume energy by the vehicle, as well as energy of the mobile device being tracked.

An improved tracking approach may be implemented that reduces power usage of the vehicle. In the improved approach, initially the user carrying the mobile device may be walking towards the vehicle. A transceiver may be used to track the mobile device when the user is still relatively far from the vehicle (e.g., more than 20 meters in an example). This monitoring of user distance may be performed using Bluetooth received signal strength indicator (RSSI), in an example, which requires less power than UWB anchors. Responsive to the user reaching a first distance to the vehicle (in an example 10 meters), the controller may activate a single designated one of a plurality of UWB anchors of the vehicle. This designated UWB anchor may be a central one of the UWB anchors in an example. Or, in another example, the designated UWB anchor may be selected round robin or randomly from the available UWB anchors, e.g., switching to the next UWB anchor every N milliseconds (e.g., every 100 milliseconds as one possibility). As the user continues to approach the vehicle within the first distance threshold, the designated UWB device exchanges TOF messages and monitors the distance to the mobile device. Once the distance reaches a second, smaller distance (e.g., 6 meters), the controller activates the remaining UWB anchors as well. As the user position continues to be tracked, the controller deactivates unnecessary UWB anchors, such that only a minimum subset of the UWB anchors (e.g., those closest to the user) are kept on. Accordingly, the controller may continue to track the user's position in a power efficient manner. Further aspects of the disclosure are discussed in detail herein.

FIG. 1 illustrates an example system 100 including a vehicle 102 implementing an improved tracking approach to selectively power down various of the UWB anchors 104 to preserve energy of the vehicle 102. As shown, the vehicle 102 includes a plurality of UWB anchors 104, a transceiver 106, and a controller 108. The system 100 may be used to track the position of mobile devices 110. Thes mobile devices 110 may include smartphones, smart tools, and/or other devices of interest.

Referring more specifically to FIG. 1, the vehicle 102 may be any passenger or commercial automobile such as a car, a truck, a sport utility vehicle, a crossover, a van, a minivan, a taxi, a bus, etc. The vehicle 102 may include various types of automobile, crossover utility vehicle (CUV), sport utility vehicle (SUV), truck, recreational vehicle, motorcycle, boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle.

The UWB anchors 104 communicate wirelessly with the mobile device 110 using radio waves. The UWB anchors 104 use an ultra-wideband signal, e.g., a signal with a low energy level spread over a large range of the radio spectrum. The Federal Communications Commission and the International Telecommunications Union Radiocommunication Sector define ultra-wideband as an antenna transmission for which emitted signal bandwidth exceeds the lesser of 500 MHz or 20% of the arithmetic center frequency. The UWB anchors 104 may use any suitable modulation method, e.g., orthogonal frequency-division multiplexing (OFDM), phase-shift keying (PSK), pulse-position modulation (PPM), etc.

The UWB anchors 104 may be mounted to the body of the vehicle 102. The quantity of the UWB anchors 104 may be at least four. In the illustrated example, seven UWB anchors 104 are shown. As illustrated, these include a first UWB anchor 104*a*, a second UWB anchor 104*b*, a third UWB anchor 104*c*, a fourth UWB anchor 104*d*, a fifth UWB anchor 104*e*, a sixth UWB anchor 104*f*, and a seventh UWB anchor 104*g*. The UWB anchors 104 are spaced apart from each other, e.g., spread over the vehicle 102, to increase the ability to distinguish a location when used for trilateration. For example, four of the UWB anchors 104 may be located at respective corners of the vehicle 102 to maximize the horizontal spread of the UWB anchors 104, and the remaining three UWB anchors 104 may be located internally to a footprint of the vehicle 102 at different heights than the corner-mounted UWB anchors 104 to provide a vertical spread. To perform trilateration, computation of the intersection of three or more circles or spheres, may provide the location of the detected device.

The transceiver 106 may be adapted to transmit signals wirelessly through a different communication protocol than what is used by the UWB anchors 104, such as cellular, Bluetooth®, Bluetooth® Low Energy (BLE), WiFi, Institute of Electrical and Electronics Engineer (IEEE) standard 802.11a/b/g/p, cellular-V2X (CV2X), Dedicated Short-Range Communications (DSRC), etc. The transceiver 106 is adapted to communicate using a protocol that is also used by the mobile device 110. In particular, the transceiver 106 may use BLE. The transceiver 106 may be one device or may include a separate transmitter and receiver.

The controller 108 may be a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The controller 108 can thus include a processor, a memory, etc. The memory of the controller 108 can include media for storing instructions executable by the processor as well as for electronically storing data and/or databases, and/or the controller 108 can include structures such as the foregoing by which programming is provided. The controller 108 can be multiple computers coupled together.

The controller 108 may transmit and receive data through a communications network such as a controller area network (CAN) bus, Ethernet, WiFi, Local Interconnect Network (LIN), onboard diagnostics connector (OBD-II), and/or by any other wired or wireless communications network. The controller 108 may be communicatively coupled to the UWB anchors 104, a transceiver 106, and other components via the communications network.

The UWB anchors 104 and the transceiver 106 may communicate with at least one mobile device 110. The mobile devices 110 may include portable computing devices such as smart keyfobs; mobile phones, e.g., smartphones; wearable devices, e.g., smartwatches, headsets, etc.; tablets; smart tools, etc. The mobile devices 110 are computing devices including respective processors and respective memories. The mobile devices 110 may be owned and carried by respective persons who may be operators and/or owners of the vehicle 102.

The UWB anchors 104 may continually monitor user movement. However, this may consume energy by the vehicle 102, as well as energy of the user's mobile device 110 being tracked. Thus, an improved tracking approach may be implemented.

Figure 2:
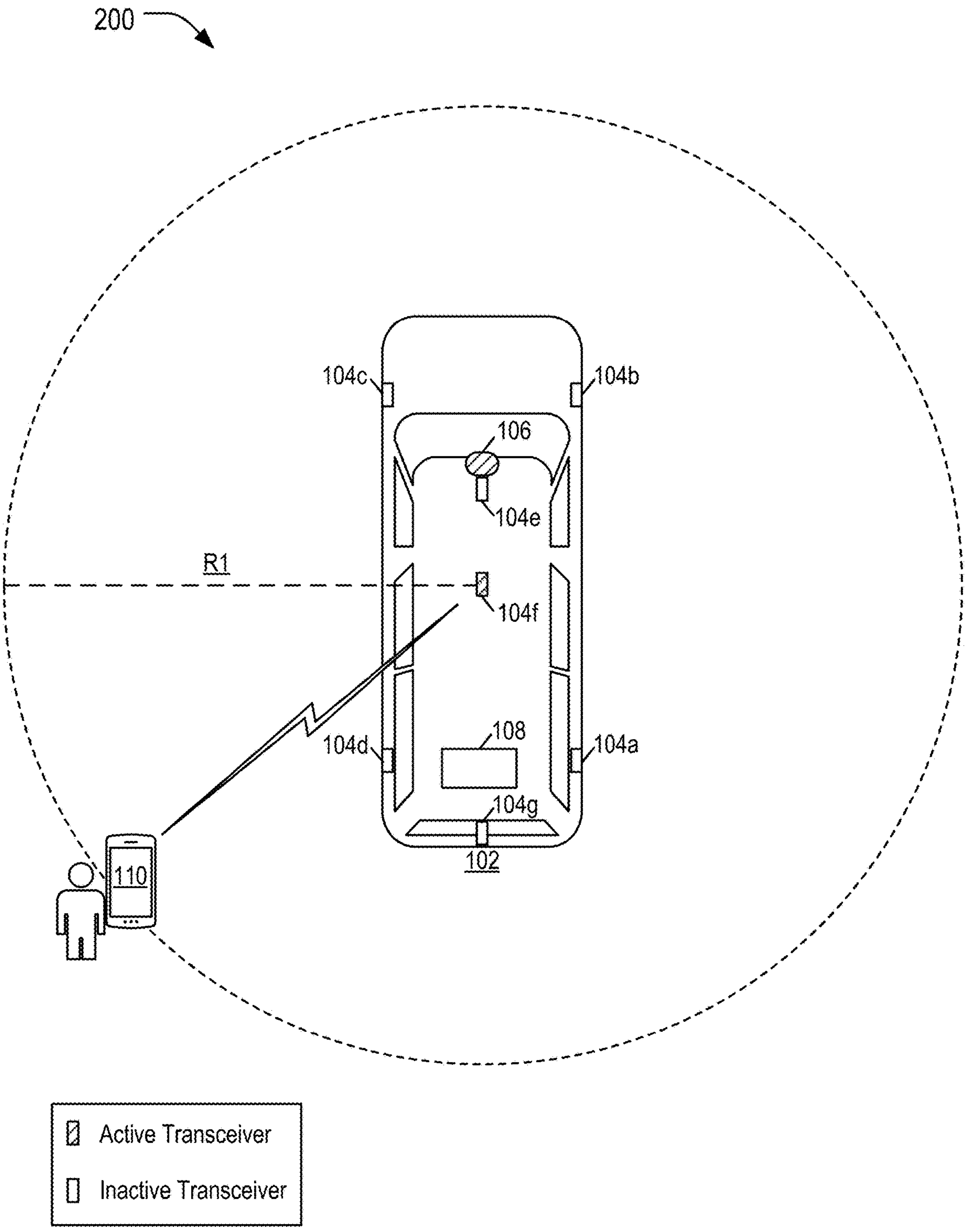
FIG. 2 illustrates an example of the vehicle activating the designated UWB anchor, responsive to the location of the mobile device reaching the first distance.

In the improved approach, the user carrying the mobile device 110 may be walking towards the vehicle 102. The transceiver 106 may be used to track the mobile device 110 when the user is still relatively far from the vehicle 102 (e.g., more than 20 meters in an example). This monitoring of user distance may be performed based on Bluetooth RSSI, in an example. Responsive to the user reaching a first distance (R1) to the vehicle 102 (in an example 10 meters), the controller 108 may activate a single designated one of the UWB anchors 104 (e.g., UWB anchor 104*f* as shown in FIG. 2). This designated UWB anchor 104 may be a central one of the UWB anchors 104 in an example. Or, in another example, the designated UWB anchor 104 may be selected round robin or randomly from the available UWB anchors 104, e.g., switching to the next UWB anchor 104 every N milliseconds (e.g., every 100 milliseconds as one possibility). The vehicle 102 may begin tracking the user's position using the one UWB anchor 104 provided the user remains within the first distance surrounding the vehicle 102, instead of using more than one UWB device 104, as only a distance measure is required at this distance, not a full triangulation.

As the user continues to approach the vehicle 102 within R1, the UWB anchor 104*f* exchanges TOF messages and monitors distance to the mobile device 110 (e.g., as shown in FIG. 2). Once the distance reaches a second, smaller radial distance (e.g., 6 meters continuing with the example), the controller 108 activates the remaining the UWB anchors 104 as well (e.g., as shown in FIG. 3).

Figure 4:
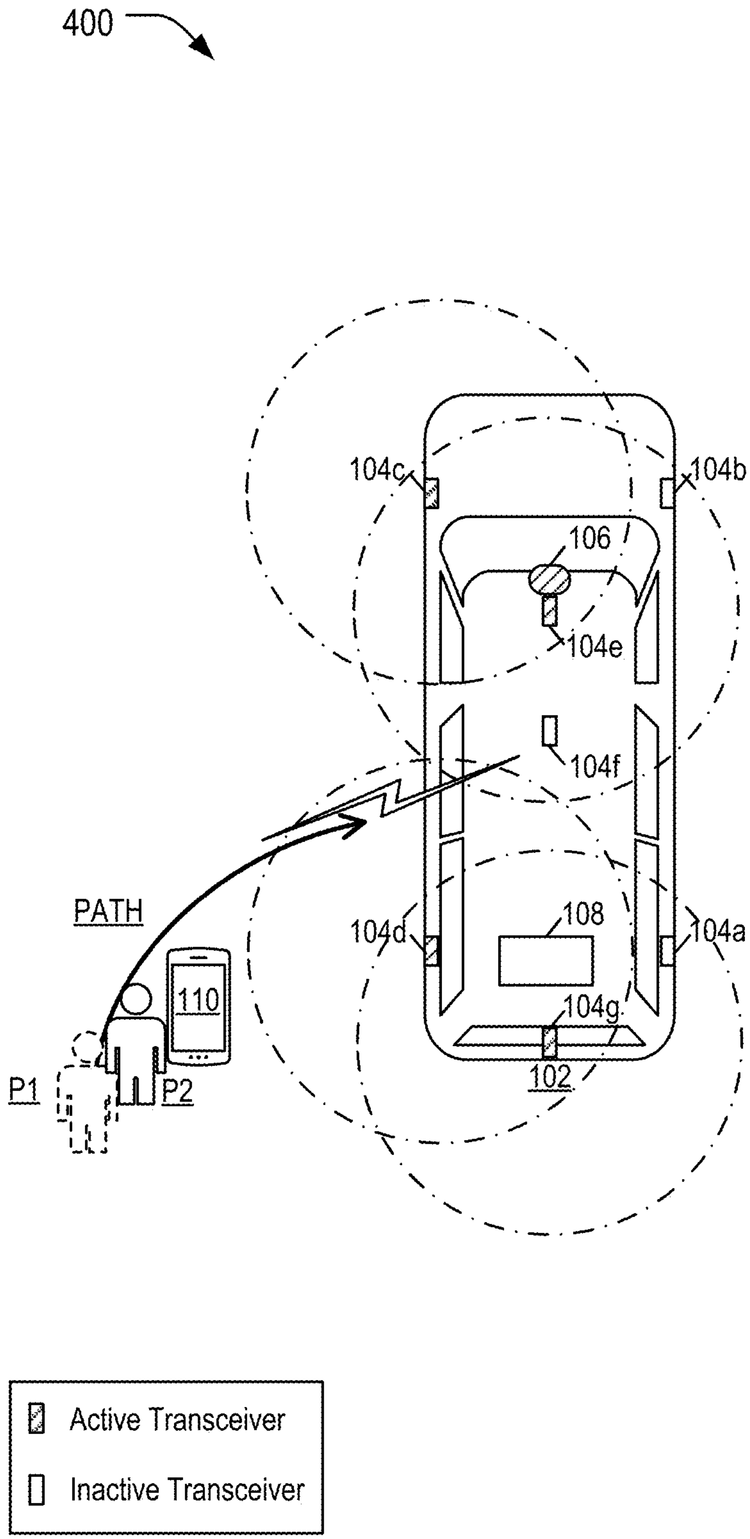
FIG. 4 illustrate an example of the vehicle triangulating the mobile device as the user move.
Figure 5:
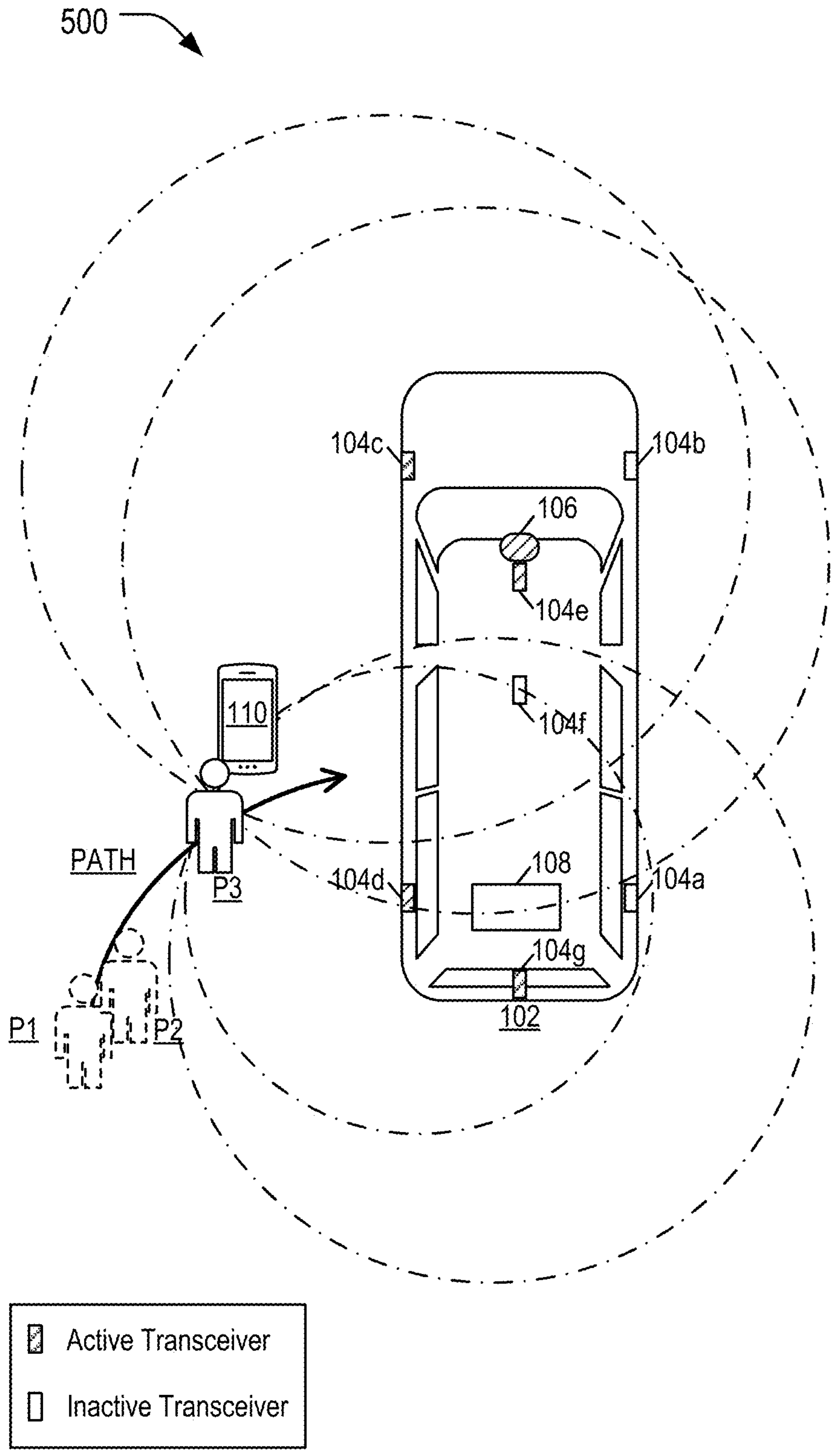
FIG. 5 illustrates an example of the vehicle continuing to triangulate the mobile device as the user moves.
Figure 6:
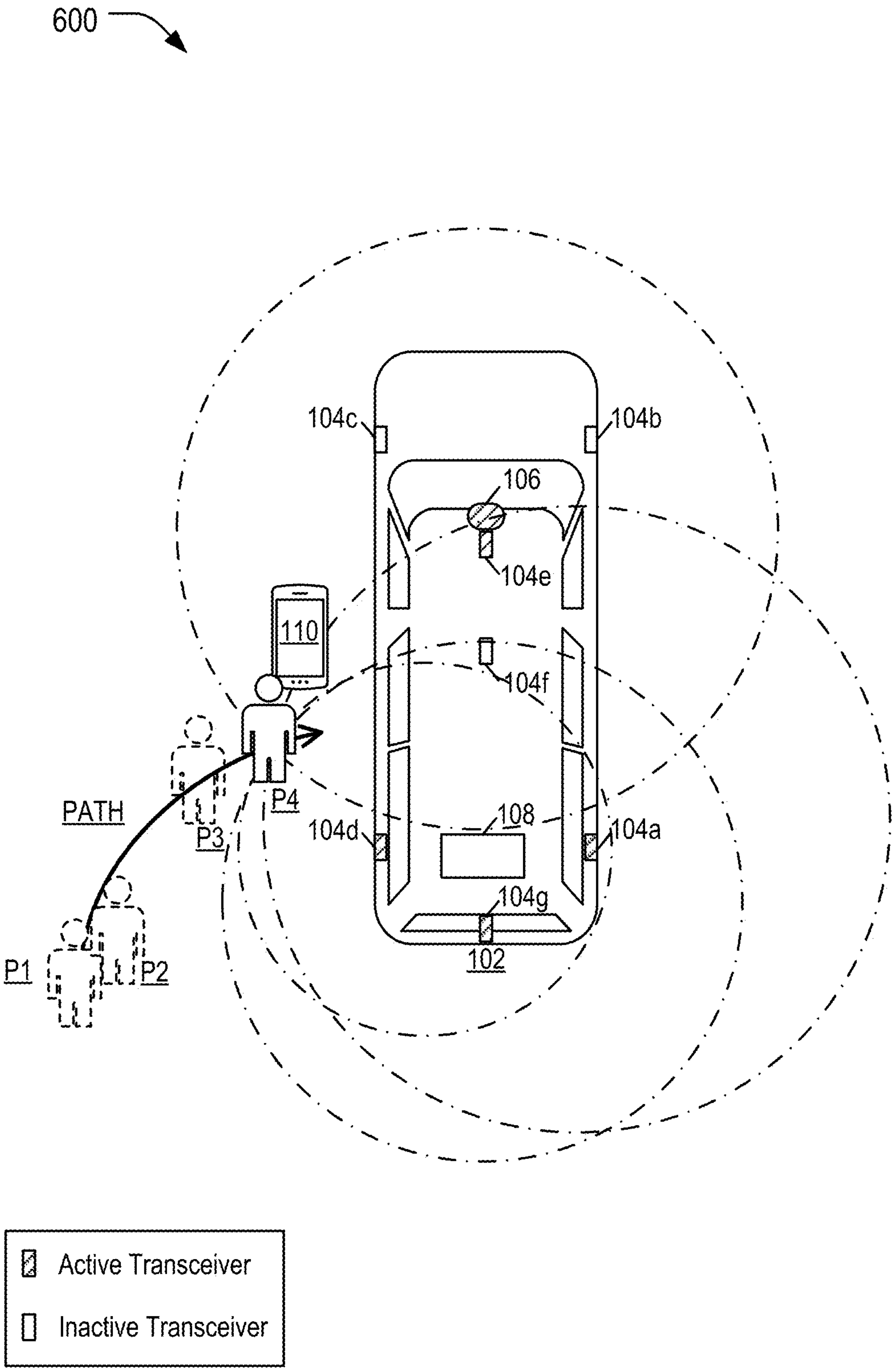
FIG. 6 illustrates an example of the vehicle adjusting the active UWB anchors based on the continued triangulation of the mobile device.

The controller 108 may localize the position of the mobile device 110 using trilateration, based on the distance information collected between each of the UWB anchors 104 and the mobile device 110. As the user proceeds towards the vehicle 102, the controller 108 may selectively power down redundant or otherwise unnecessary UWB anchors 104 (e.g., as shown in FIGS. 4-6). With this approach, the vehicle 102 may deactivate unnecessary UWB anchors 104 that are not required to track the position of the mobile device 110, which may save power and device life time. For instance, the vehicle 102 may identify a set of the three or four closest UWB anchors 104 to the mobile device 110 and may use those to complete the trilateration.

FIG. 2 illustrates an example 200 of the vehicle 102 activating the designated UWB anchor 104, responsive to the location of the mobile device 110 reaching the first distance R1. In this example the designated UWB anchor 104*f* is the central UWB anchor 104, but that is only an example, and in other cases another anchor or rotation between UWB anchors 104 may be used. As shown, the user with the mobile device 110 is walking towards the vehicle 102. The vehicle 102 may be monitoring the mobile device 110 using the transceiver 106, e.g., using RSSI. The transceiver 106 may identify and begin to track the user on the order of 20 meters away from the vehicle 102. The transceiver 106 may continue monitoring the distance of the mobile device 110 via RSSI. Responsive to the mobile device 110 reaching R1, the controller 108 activates the designated UWB anchor 104*f*. As the mobile device 110 is still relatively far from the vehicle 102 triangulation of the user's location is not necessary to be performed. Thus, the location services of a single UWB anchor 104 are sufficient for tracking simple distance. The UWB devices 104 and/or active transceivers 106 are shown in the FIGS as being filled with pattern, vs the inactive UWB devices 104 and/or active transceivers 106 shown without pattern fill.

Figure 3:
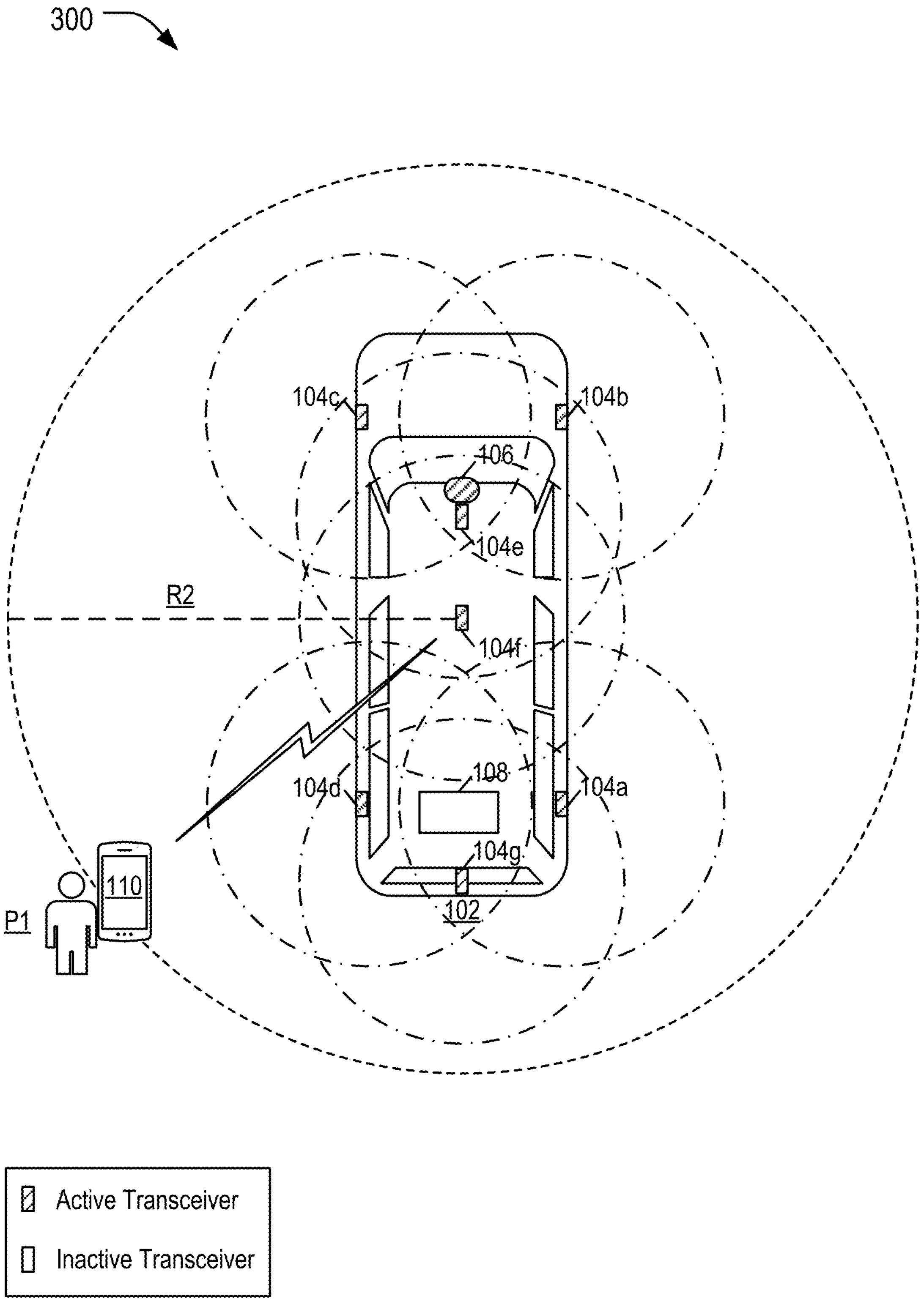
FIG. 3 illustrates an example of the vehicle activating all the UWB anchors, responsive to the location of the mobile device reaching the second distance.

FIG. 3 illustrates an example 300 of the vehicle 102 activating all the UWB anchors 104, responsive to the location of the mobile device 110 reaching the second radial distance R2. As the mobile device 110 is now closer to the vehicle 102, triangulation may be desirable beyond the single distance measurement. For instance, it may be desirable for the vehicle 102 to actuate a vehicle component according to one of the features, e.g., unlocking the doors for the digital key or operating the vehicle 102 for the remote park assist. Thus, as shown, each of the UWB anchors 104 is activated to perform positioning of the mobile device 110. This may result in identifying the location of the user at a first location, here shown as P1.

FIG. 4 illustrate an example 400 of the vehicle 102 triangulating the mobile device 110 as the user moves. As shown, the user has moved from position P1 to updated position P2. In an example, the controller 108 may periodically (e.g., every 100 milliseconds) continue to detect the position of the mobile device 110 using trilateration based on the distance information received from the UWB anchors 104.

A user heading and path (e.g., shown as PATH) may be determined by the controller 108 based on the positions P1, P2 (and/or based on further positions of the mobile device 110 that are periodically determined by the controller 108). For instance, the controller 108 may use various techniques to extrapolate a path using a sequence of a plurality of the determined positions of the mobile device 110 (e.g., by finding change and/or rate of change of X, Y, and/or Z in the series of positions, and using that change and/or rate of change to estimate future positions). Based on the positions and/or the PATH, the controller 108 may selectively deactivate those of the UWB anchors 104 that are less useful in positioning the mobile device 110.

As shown, the controller 108 has selected UWB anchors 104*c*, 104*d*, 104*e*, and 104*g* to remain active, while deactivating UWB anchors 104*a*, 104*b*, and 104*f*. In one non-limiting example, the controller 108 may select the closest N of the UWB anchors 104, where N is a predefined quantity such as three or four. In one non-limiting example, the controller 108 may elect to include, in the closest N UWB anchors 104 at least one of the UWB anchors 104 located at respective corners of the vehicle 102 and at least one of the UWB anchors 104 located at different heights than the corner-mounted UWB anchors 104 to provide a vertical spread to the determined subset. Having a vertical spread to the UWB anchors 104, in addition to length and width, may allow the controller 108 to create zones in and around the vehicle 102 that identify whether the tracked mobile device 110 is above or underneath the vehicle 102.

FIG. 5 illustrates an example 500 of the vehicle 102 continuing to triangulate the mobile device 110 as the user moves. As shown, the user has moved from position P2 to updated position P3. Based on the updated position, the controller 108 maintained the same set of UWB anchors 104 for use in locating the mobile device 110.

FIG. 6 illustrates an example 600 of the vehicle 102 adjusting the active UWB anchors 104 based on the continued triangulation of the mobile device 110. As shown, the user has moved from position P3 to updated position P4. Additionally, at P4, the controller 108 determines that the set of active UWB anchors 104 should be changed to better reflect the UWB anchors 104 that are closest to the new position of the mobile device 110. As shown, the controller 108 has swapped in the first UWB anchor 104*a*, while deactivating the third UWB anchor 104*c*. Thus, the controller 108 may continually determine and dynamically adjust the subset of UWB anchors 104, thereby preserving accuracy and energy efficiency.

Figure 7:
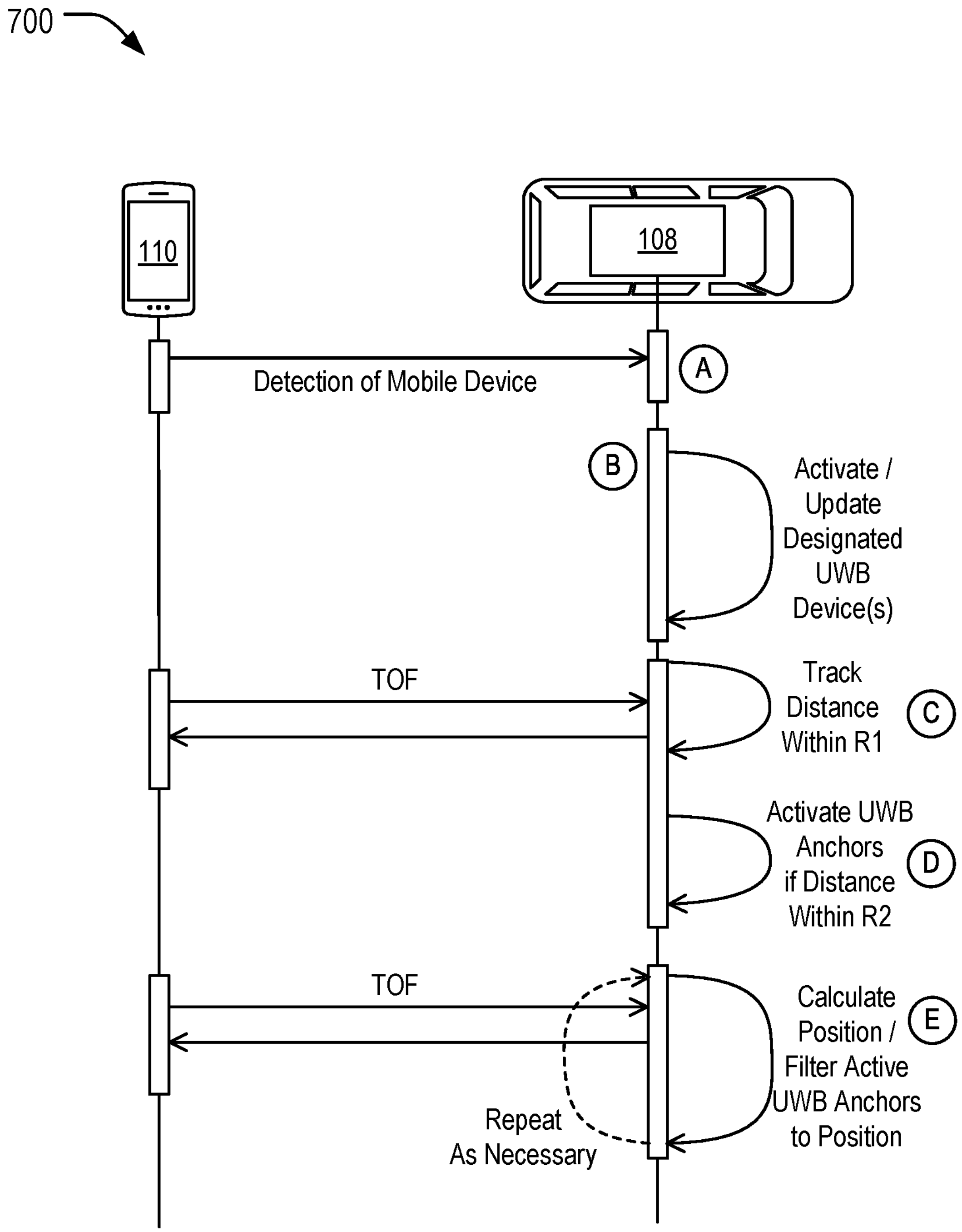
FIG. 7 illustrates an example data flow for the operation of the controller of the vehicle in implementing the improved tracking approach.

FIG. 7 illustrates an example data flow 700 for the operation of the controller 108 of the vehicle 102 in implementing the improved tracking approach. In an example, the data flow 700 may be performed by the vehicle 102 in the context of the system 100.

At index (A), the controller 108 utilizes the transceiver 106 to detect the presence of the mobile device 110. In an example, the transceiver 106 may be used to track the mobile device 110 when the user is still relatively far from the vehicle 102 (e.g., more than 20 meters in an example). This monitoring of user distance may be performed based on Bluetooth RSSI. Thus, the controller 108 may use the transceiver 106 to detect and track the mobile device 110 while the UWB anchors 104 are unpowered.

At index (B), the controller 108 activates the designated UWB anchor 104 in response to the detection of the mobile device 110. In an example, responsive to the user reaching the first distance (R1) to the vehicle 102 (in an example 10 meters) as determined using the transceiver 106, the controller 108 may activate a single designated one of the UWB anchors 104. In one non-limiting example, the UWB anchor 104 closest to the center of the vehicle 102 (e.g., the UWB anchor 104*f*) may be powered to operate to track the distance of the mobile device 110 from the vehicle 102 more precisely than may be possible using the transceiver 106. Notably, the designated UWB anchor 104*f* may require more power than to operate using the transceiver 106. Or, in another example, the designated UWB anchor 104 may be selected round robin or randomly from the available UWB anchors 104 or a subset of the UWB anchors 104, e.g., switching to the next UWB anchor 104 every N milliseconds (e.g., every 100 milliseconds as one possibility). It should be noted that in such an example, this switching may occur throughout the continued operation of indexes (C)-(D).

At index (C), the controller 108 monitors the location of the mobile device 110. As the user continues to approach the vehicle 102 within R1, the designated UWB device 104 exchanges TOF messages and monitors distance to the mobile device 110. The controller 108 may monitor TOF signals between the designated UWB anchor 104 and the mobile device 110 to determine whether the location of the mobile device 110 becomes within the second radial distance (R2).

Responsive to the user reaching a R2 to the vehicle 102 (in an example 10 meters), at index (D) the controller 108 may activate all of the UWB anchors 104. This activation may be performed to allow the controller 108 to determine the position and/or path of the mobile device 110. This position and/or path information may allow the controller 108 to selectively deactivate those of the UWB anchors 104 that are less useful in positioning the mobile device 110.

At index (E), the controller 108 uses the subset of the UWB anchors 104 to triangulate the location of the mobile device 110. This subset may be determined to be the closest N of the UWB anchors 104 or the highest signal strength N of the UWB anchors 104, where N is a predefined quantity such as three or four. In one non-limiting example, the controller 108 may elect to include, in the closest N UWB anchors 104 at least one of the UWB anchors 104 located at respective corners of the vehicle 102 and at least one of the UWB anchors 104 located at different heights than the corner-mounted UWB anchors 104 to provide a vertical spread to the determined subset.

The controller 108 may continue the tracking of the mobile device 110 using the subset of the UWB anchors 104. This tracking may be used to activate various vehicle 102 features. For instance, the controller 108 may unlock only the closes door or doors to the mobile device 110. Or, the controller 108 may activate welcome lights on the side of the vehicle 102 that the user is approaching.

It should be noted that the subset of the UWB anchors 104 to triangulate the location of the mobile device 110 may be adjusted periodically. For example, the location of the mobile device 110 may be periodically determined by the controller 108, and the subset of the UWB anchors 104 may be updated responsive to these periodic determinations, to allow the subset of the UWB anchors 104 to continue to be the best set of the UWB anchors 104 for monitoring the mobile device 110 as the user moves around the vehicle 102.

Figure 8:
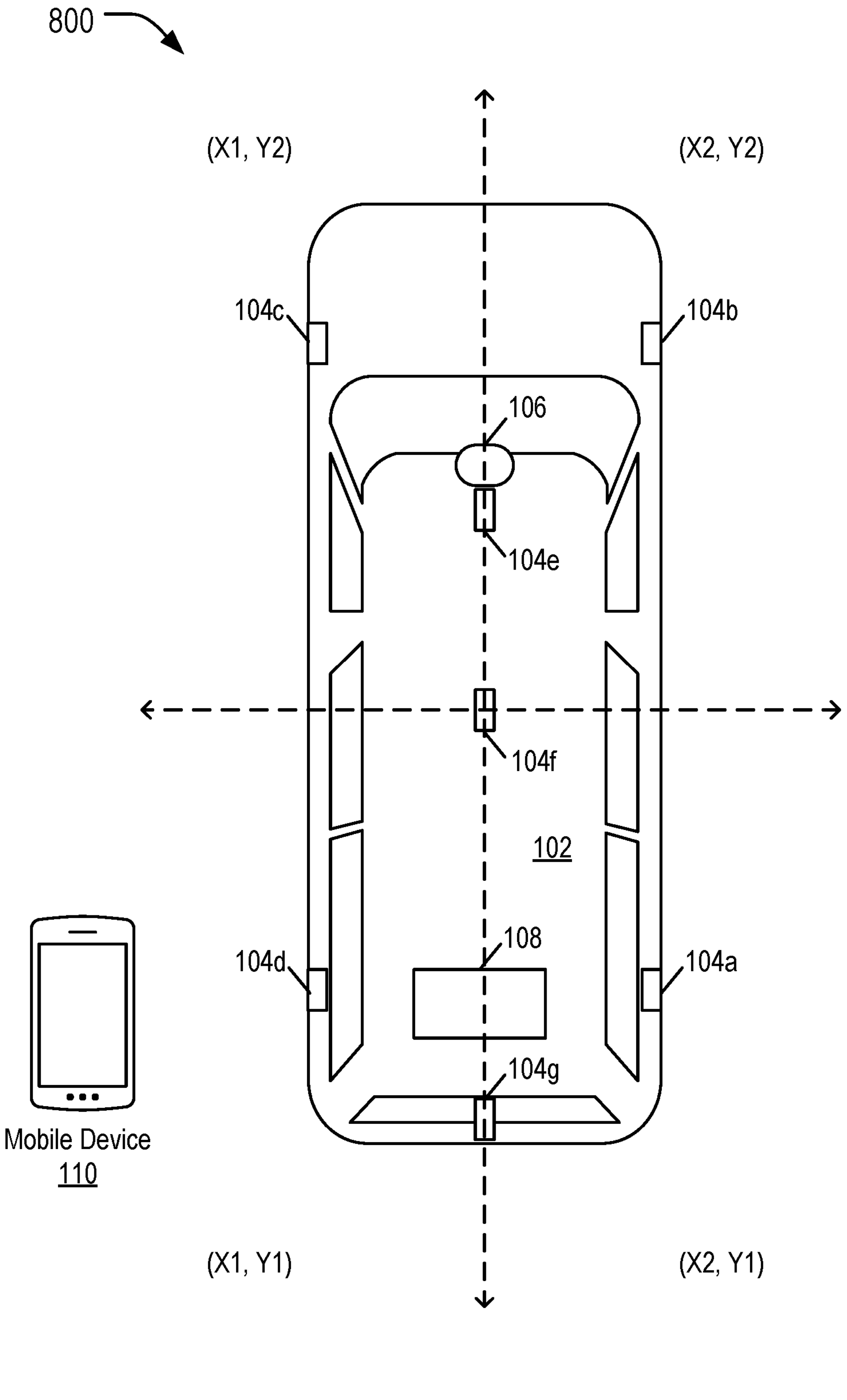
FIG. 8 illustrates an example of operation of a quadrant-based implementation of the improved tracking approach.

FIG. 8 illustrates an example 800 of operation of a quadrant-based implementation of the improved tracking approach. As shown, the area surrounding the vehicle 102 is divided into four quadrants: (X1, Y1), (X1, Y2), (X2, Y1), and (X2, Y2).

In the example 800, the controller 108 analyzes Bluetooth signals from the transceiver 106 to identify an initial user authentication of the mobile device 110 to trigger a UWB network wake up signal and to observe after initial measurements (e.g., for 300 ms) that the received signal strength indicator (RSSI) of the initiator mobile device 110 device (which contains both BLE and UWB capabilities and is carried by the user) to be increasing as the user approaches the vehicle 102.

Responsive to the RSSI increasing past a predefined energy threshold $T_o$, the controller 108 proceeds to send universal interface (UCI) commands to the UWB anchors 104 to begin ranging the mobile device 110 to the vehicle 102.

As the user carrying the mobile device 110 as a UWB initiator device approaches the vehicle 102, the controller 108 detects the incrementally reduced distance between the user and the UWB anchors 104. The controller 108 also detects an incremental increase in received signal power between respective UWB anchors 104 and the mobile device 110 as initiator (e.g., after a plurality of ranging operations performed within some number of milliseconds)

The controller 108 may then proceed to send new appropriate UCI commands to disable ranging (e.g., turn off certain of the UWB anchors 104) for all UWB anchors 104 except only one or two UWB anchors 104 with the strongest received signal power and/or the shortest ranges.

Responsive to the detected distance between the user (e.g., the mobile device 110 acting as initiator) and any one of the active UWB anchors 104 is reduced below a predefined distance threshold $D_o$ (indicating proximity to the vehicle 102 for certain vehicle 102 feature operations and functionalities), the controller 108 may wake up one or more of the next closest UWB anchors 104 by sending them new targeted/appropriate UCI commands. Similar operations (but in a reverse order) may be applied as the user starts to move away from the vehicle 102.

A similar operation to save power can be applied as the user moves around the vehicle 102. More specifically, the controller 108 may perform trilateration using two or more received UWB anchor 104 ranges, where responsive to the controller 108 determining that the computed user location coordinates (X, Y) or (X, Y, Z) to be in one of the four possible regions around the vehicle 102 (e.g., front right, front left, rear left, rear right), then the controller 108 may proceed to turn off the UWB anchors 104 that range for regions other than the one in which the mobile device 110 is located, and not wake them up until the user nears the edge of or is about to leave the current region.

The UWB anchor 104 coordinates (relative to the vehicle 102) and the dimensions of the vehicle 102 (length, width, height) may be known a priori and may be embedded (or hard-coded) into the localization mechanism/algorithm of the controller 108. Therefore, once the location of a mobile device 110 is determined, the controller 108 may infer into which zone or position the mobile device 110 is located, including whether the mobile device 110 is, in, around, or under the vehicle 102.

Figure 9:
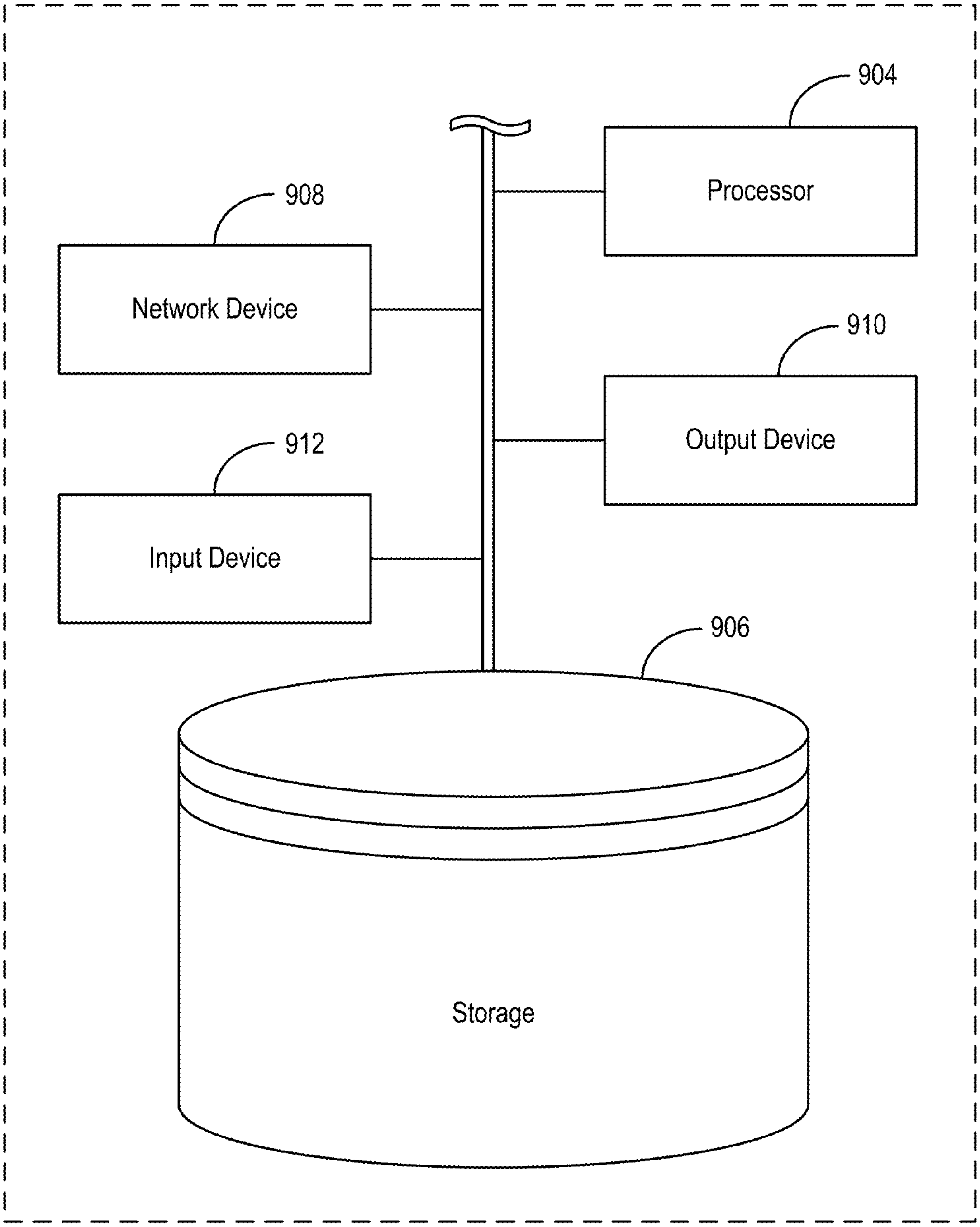
FIG. 9 illustrates an example computing device for implementing the improved tracking approach to selectively power down various of the UWB anchors to preserve energy of the vehicle.

FIG. 9 illustrates an example computing device 902 for implementing the improved tracking approach to selectively power down various of the UWB anchors 104 to preserve energy of the vehicle 102. Referring to FIG. 9, and with reference to FIGS. 1-8, the vehicle 102, UWB anchors 104, transceiver 106, controller 108, and mobile device 110 may be examples of such computing devices 902. Computing devices 902 generally include computer-executable instructions, where the instructions may be executable by one or more computing devices 902. Computer-executable instructions may be compiled or interpreted from computer programs created using a variety of programming languages and/or technologies, including, without limitation, and either alone or in combination, Java™, C, C++, C #, Visual Basic, JavaScript, Python, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

As shown, the computing device 902 may include a processor 904 that is operatively connected to a storage 906, a network device 908, an output device 910, and an input device 912. It should be noted that this is merely an example, and computing devices 902 with more, fewer, or different components may be used.

The processor 904 may include one or more integrated circuits that implement the functionality of a central processing unit (CPU) and/or graphics processing unit (GPU). In some examples, the processors 904 are a system on a chip (SoC) that integrates the functionality of the CPU and GPU. The SoC may optionally include other components such as, for example, the storage 906 and the network device 908 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 904 executes stored program instructions that are retrieved from the storage 906. The stored program instructions, accordingly, include software that controls the operation of the processors 904 to perform the operations described herein. The storage 906 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic random access memory (RAM) that stores program instructions and data during operation of the system 100.

The GPU may include hardware and software for display of at least two-dimensional (2D) and optionally three-dimensional (3D) graphics to the output device 910. The output device 910 may include a graphical or visual display device, such as an electronic display screen, projector, printer, or any other suitable device that reproduces a graphical display. As another example, the output device 910 may include an audio device, such as a loudspeaker or headphone. As yet a further example, the output device 910 may include a tactile device, such as a mechanically raiseable device that may, in an example, be configured to display braille or another physical output that may be touched to provide information to a user.

The input device 912 may include any of various devices that enable the computing device 902 to receive control input from users. Examples of suitable input devices 912 that receive human interface inputs may include keyboards, mice, trackballs, touchscreens, microphones, graphics tablets, and the like.

The network devices 908 may each include any of various devices that enable the described components to send and/or receive data from external devices over networks. Examples of suitable network devices 908 include an Ethernet interface, a Wi-Fi transceiver, a cellular transceiver, or a BLUETOOTH or BLE transceiver, or other network adapter or peripheral interconnection device that receives data from another computer or external data storage device, which can be useful for receiving large sets of data in an efficient manner.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as “a,” “the,” “said,” etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for implementing an improved tracking approach for mobile devices, comprising:

activating a designated ultra-wideband (UWB) anchor of a plurality of UWB anchors of a vehicle to perform time of flight (TOF) distance measurements between the vehicle and a mobile device responsive to detecting, using a transceiver of the vehicle, the mobile device reaching a first distance from the vehicle;

activating the plurality of UWB anchors to perform trilateration between the vehicle and the mobile device to identify a position of the mobile device responsive to the TOF distance measurements between the mobile device and the designated UWB anchor indicating the mobile device has reached a closer, second distance from the vehicle;

utilizing a subset of the UWB anchors of the vehicle to continuing to perform the trilateration based on the position, and inhibiting a remainder of the UWB anchors other than the subset of the UWB anchors to save power; and actuating a component of the vehicle based on a result of the trilateration.

2. The method of claim 1, further comprising:

periodically identifying updated positions of the mobile device using the subset of the UWB anchors; and based on the identified updated position, updating the subset of the UWB anchors of the vehicle being used to perform the trilateration, and inhibit a remainder of the UWB anchors other than the subset to save power.

3. The method of claim 1, wherein the subset of the UWB anchors includes a closest number N of the UWB anchors to the mobile device, wherein N is at least three.

4. The method of claim 3, wherein the subset of the UWB anchors includes at least one of the UWB anchors located at a corner of the vehicle and at least one of the UWB anchors located at a different height than the corner-mounted UWB anchors to provide a vertical spread to the subset.

5. The method of claim 1, wherein the designated UWB anchor is one of the plurality UWB anchors most centrally located within the vehicle.

6. The method of claim 1, wherein the designated UWB anchor is periodically selected round robin and/or randomly from the plurality of UWB anchors.

7. The method of claim 1, wherein actuating the component of the vehicle includes unlocking doors of the vehicle or operating a remote park assist feature of the vehicle.

8. The method of claim 1, wherein performing the trilateration includes identifying a quadrant surrounding the vehicle in which the mobile device is located, and wherein actuating the component of the vehicle includes actuating a component within the identified quadrant.

9. A system for implementing an improved tracking approach of mobile devices, comprising:

a transceiver of a vehicle;

a plurality of UWB anchors of the vehicle; and one or more computing devices, configured to:

activate a designated ultra-wideband (UWB) anchor of the plurality of UWB anchors to perform time of flight (TOF) distance measurements between the vehicle and a mobile device responsive to detecting, using the transceiver, the mobile device reaching a first distance from the vehicle;

activate the plurality of UWB anchors to perform trilateration between the vehicle and the mobile device to identify a position of the mobile device responsive to the TOF distance measurements between the mobile device and the designated UWB anchor indicating the mobile device has reached a closer, second distance from the vehicle;

utilize a subset of the UWB anchors of the vehicle to continue to perform the trilateration based on the position, and inhibit a remainder of the UWB anchors other than the subset of the UWB anchors to save power; and actuate a component of the vehicle based on a result of the trilateration.

10. The system of claim 9, wherein the one or more computing devices are further configured to:

periodically identify updated positions of the mobile device using the subset of the UWB anchors; and based on the identified updated position, update the subset of the UWB anchors of the vehicle being used to perform the trilateration, and inhibit a remainder of the UWB anchors other than the subset to save power.

11. The system of claim 9, wherein the subset of the UWB anchors includes closest one or more of the UWB anchors to the mobile device.

12. The system of claim 9, wherein the subset of the UWB anchors includes one or more of the UWB anchors showing closest distances to the mobile device.

13. The system of claim 12, wherein the subset of the UWB anchors includes at least one of the UWB anchors located at a corner of the vehicle and at least one of the UWB anchors located at a different height than the corner-mounted UWB anchors to provide a vertical spread to the subset.

14. The system of claim 9, wherein to actuate the component of the vehicle includes to unlock doors of the vehicle or to operate a remote park assist feature of the vehicle.

15. The system of claim 9, wherein to perform the trilateration includes to identify a quadrant surrounding the vehicle in which the mobile device is located, to actuate the component of the vehicle includes to actuate a component within the identified quadrant.

16. A non-transitory computer readable medium comprising instructions for implementing an improved tracking approach of mobile devices that, when executed by one or more computing devices of a vehicle having a transceiver and a plurality of UWB anchors, cause the vehicle to perform operations including to:

activate a designated ultra-wideband (UWB) anchor of the plurality of UWB anchors to perform time of flight (TOF) distance measurements between the vehicle and a mobile device responsive to detecting, using the transceiver, the mobile device reaching a first distance from the vehicle;

activate the plurality of UWB anchors to perform trilateration between the vehicle and the mobile device to identify a position of the mobile device responsive to the TOF distance measurements between the mobile device and the designated UWB anchor indicating the mobile device has reached a closer, second distance from the vehicle;

utilize a subset of the UWB anchors of the vehicle to continue to perform the trilateration based on the position, and inhibit a remainder of the UWB anchors other than the subset of the UWB anchors to save power; and actuate a component of the vehicle based on a result of the trilateration.

17. The medium of claim 16, further comprising instructions that when executed by the one or more computing devices, cause the vehicle to perform operations including to:

periodically identify updated positions of the mobile device using the subset of the UWB anchors; and based on the identified updated position, update the subset of the UWB anchors of the vehicle being used to perform the trilateration, and inhibit a remainder of the UWB anchors other than the subset to save power.

18. The medium of claim 16, wherein the subset of the UWB anchors includes one or more of the UWB anchors that are closest to the mobile device, or one or more of the UWB anchors showing closest distances to the mobile device.

19. The medium of claim 16, wherein the subset of the UWB anchors includes at least one of the UWB anchors located at a corner of the vehicle and at least one of the UWB anchors located at a different height than the corner-mounted UWB anchors to provide a vertical spread to the subset.

20. The medium of claim 16, wherein to perform the trilateration includes to identify a quadrant surrounding the vehicle in which the mobile device is located, to actuate the component of the vehicle includes to actuate a component within the identified quadrant.

* * * * *